(12) United States Patent
Wang et al.

(10) Patent No.: US 8,425,046 B2
(45) Date of Patent: Apr. 23, 2013

(54) COOLING DEVICE FOR A PROJECTION APPARATUS AND SAID PROJECTION APPARATUS

(75) Inventors: Chun-Chieh Wang, Taoyuan Hsien (TW); Ren-Chun Chang, Taoyuan Hsien (TW); Wei-Zhi Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 370 days.

(21) Appl. No.: 12/769,148

(22) Filed: Apr. 28, 2010

(65) Prior Publication Data

US 2010/0309441 A1 Dec. 9, 2010

(30) Foreign Application Priority Data

Jun. 4, 2009 (TW) .............................. 98118532 A

(51) Int. Cl.
*G03B 21/18* (2006.01)
(52) U.S. Cl.
USPC ............................................................ 353/61
(58) Field of Classification Search .............. 353/52–61; 362/240, 264, 373, 345, 580, 555; 348/748
See application file for complete search history.

(56) References Cited

U.S. PATENT DOCUMENTS

| 7,384,151 | B2 | 6/2008 | Seki | |
|---|---|---|---|---|
| 2003/0179591 | A1* | 9/2003 | Chou et al. | 362/580 |
| 2006/0082732 | A1* | 4/2006 | Miwa et al. | 353/57 |

FOREIGN PATENT DOCUMENTS

CN 1667496 A 9/2005

* cited by examiner

*Primary Examiner* — Thanh Luu
*Assistant Examiner* — Danell L Owens
(74) *Attorney, Agent, or Firm* — Muncy, Geissler, Olds & Lowe, PLLC

(57) ABSTRACT

A cooling device applied in a projection apparatus and the projection apparatus are provided. The projection apparatus comprises a first light source, a second light source, a third light source and the cooling device. The cooling device comprises an airflow guiding device and a fan. The airflow guiding device is adapted to define a first flow path and a second flow path. The first flow path has a first position, while the second flow path has a second position and a third position, correspondingly disposed with the first light source, the second light source and the third light source, respectively. The fan is adapted to generate airflow. The airflow is divided into a first airflow and a second airflow entering the first flow path and the second flow path, respectively. Thereby, the cooling device is capable of matching the heat dissipation requirements of the light sources and reducing the noise generated by the cooling device by using only one fan.

17 Claims, 1 Drawing Sheet

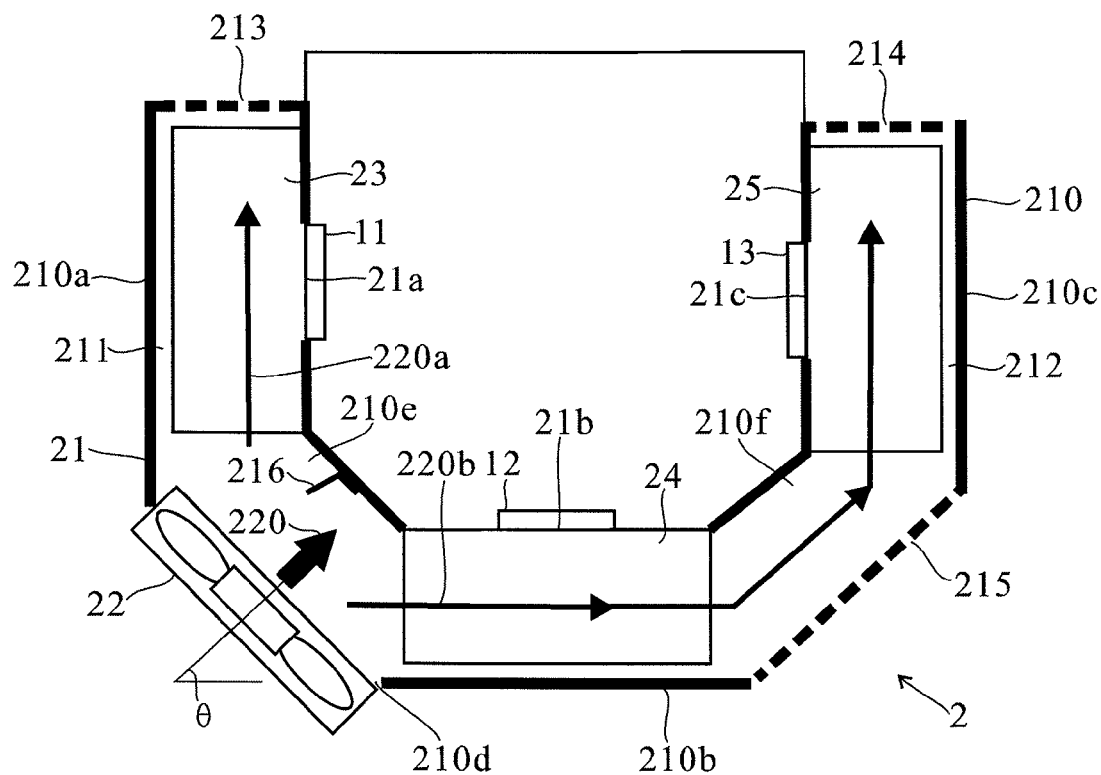

COOLING DEVICE FOR A PROJECTION APPARATUS AND SAID PROJECTION APPARATUS

This application claims priority to Taiwan Patent Application No. 098118532 filed on Jun. 4, 2009, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a projection apparatus, and particularly, to a cooling device applied in a projection apparatus.

2. Descriptions of the Related Art

Projection apparatuses have found a wide application in various business meetings and home theaters. When used in a meeting presentation or playing movies, a projection apparatus generally operates for an extended period of time, thereby generating excessive heat in the projection apparatus. To prevent shutdown and premature failure of the projection apparatus due to excessive heat, a fan is often provided in the prior art to dissipate heat generated during the operation of the projection apparatus.

Generally, the conventional cooling device usually employs a fan to assist in dissipating the heat generated by the projection apparatus. However, as the projection apparatus is often equipped with a plurality of light sources, it is sometimes difficult to effectively dissipate the heat generated by these light sources by use of a single fan, thereby causing a thermal shutdown. In addition, when a plurality of light emitting diodes (LEDs) of different colors are used as light sources, the LEDs of different colors typically have different heat generation amounts and operating temperatures. For example, the green LED has the largest heat generation amount, while the blue LED requires a lower operating temperature. Hence, it is very difficult to satisfy the heat dissipation requirements of the different colored LEDs by using a single fan. Therefore, most of the cooling devices currently available are provided with two or more fans for cooling LEDs of different colors respectively to improve the cooling effect. Unfortunately, this adds to the cost and occupies a large space, and moreover, noises that are frequently generated during the operation of the fans have an impact on the quality of the presentation.

In view of this, it is highly desirable in the art to provide both a cooling device and a projection apparatus comprising the cooling device that are adapted to reduce the number of fans while still satisfying the heat dissipation requirements of the light sources.

SUMMARY OF THE INVENTION

The objective of the present invention is to provide a projection apparatus and a cooling device thereof. The cooling device is adapted to satisfy the heat dissipation requirement of light sources by using the least number of fans, thereby outwardly dissipating the heat generated by the projection apparatus efficiently and reducing the noise.

The projection apparatus of the present invention comprises a first lighting source, a second lighting source, a third lighting source, and a cooling device. The cooling device comprises an airflow guiding device and a fan. The airflow guiding device is adapted to define a first flow path and a second flow path. The first flow path has a first position, while the second flow path has a second position and a third position. The first light source, the second light source and the third light source are disposed at the first position, the second position and the third position respectively and correspondingly. The fan is adapted to generate an airflow. The airflow is divided into a first airflow and a second airflow while the airflow enters the first flow path and the second flow path of the airflow guiding device respectively. The first airflow flows through the first position of the first flow path, while the second airflow flows through the second position and the third position of the second flow path in this order. In this way, the cooling device is adapted to assist in dissipating heat generated by the first light source, the second light source and the third light source respectively by using the least number of fans.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1 is a schematic view of a projection apparatus and a cooling device thereof according to the present invention.

DESCRIPTION OF THE PREFERRED EMBODIMENT

FIG. 1 illustrates a projection apparatus 1 according to an embodiment of the present invention comprises a first light source 11, a second light source 12, a third light source 13 and a cooling device 2. To illustrate the cooling device 2 of the present invention clearly, other elements of the projection apparatus 1 that are unrelated to the present invention are not depicted in FIG. 1. The cooling device 2 comprises an airflow guiding device 21 and a fan 22. The airflow guiding device 21 is adapted to define a first flow path 211 and a second flow path 212. The end of the first flow path 211 and the end of the second flow path 212 are formed with a plurality of air vents 213, 214 respectively.

The fan 22 is adapted to generate an air flow 220 which, when entering the first flow path 211 and the second flow path 212 respectively, are divided into a first airflow 220a and a second airflow 220b respectively. The first flow path 211 has a first position 21a, while the second flow path 212 has a second position 21b and a third position 21c. The first light source 11, the second light source 12 and the third light source 13 are disposed at the first position 21a, the second position 21b and the third position 21c respectively. With the arrangement of these elements, the first airflow 220a is adapted to flow through the first position 21a of the first flow path 211, while the second airflow 220b is adapted to flow through the second position 21b and the third position 21c of the second flow path 212 in sequence to effuse outwards via the air vents 213, 214. In this way, the goal of cooling the three light sources 11, 12, 13 can effectively be achieved by using a single fan 22 in the projection apparatus 1. The structure and the airflow guiding approach of the cooling device 2 of the present invention will be detailed as follows.

The airflow guiding device 21 of the cooling device 2 preferably comprises an airflow guiding tube which, in this embodiment, is a U-shaped airflow guiding tube 210. The U-shaped airflow guiding tube 210 has a first lateral tube

210a, a central connecting tube 210b, a second lateral tube 210c, an air inlet 210d, a first curved portion 210e and a second curved portion 210f. Therein, the central connecting tube 210b is adapted to connect the first lateral tube 210a and the second lateral tube 210c to form a U-shaped structure. The first lateral tube 210a is adapted to define a first flow path 211, while the central connecting tube 210b and the second lateral tube 210c are adapted to define the second flow path 212 together. The first position 21a, the second position 21b and the third position 21c are located at the first lateral tube 210a, the central connecting tube 210b and the second lateral tube 210c respectively. The first curved portion 210e connects the first lateral tube 210a and the central connecting tube 210b, the second curved portion 210f connects the central connecting tube 210b and the second lateral tube 210c, and the air inlet 210d is disposed on the first curved portion 210e.

With this arrangement, the airflow 220 generated by the fan 22 is adapted to enter the U-shaped airflow guiding tube 210 via the air inlet 210d and be divided into the first airflow 220a and the second airflow 220b. The first airflow 220a enters the first lateral tube 210a and flows through the first position 21a along the first flow path 211 to carry away the heat generated by the first light source 11 disposed at the first position 21a. The second airflow 220b enters the central connecting tube 210b, the second curved portion 210f and the second lateral tube 210c in sequence, and flows through the second position 21b and the third position 21c of the second flow path 212 in sequence to carry away the heat generated by the second light source 12 disposed at the second position 21b and the third light source 13 disposed at the third position 21c respectively.

In this embodiment, the first light source 11, the second light source 12 and the third light source 13 are three light emitting diode (LED) modules. Because different LED modules have different efficiencies and energy consumption rates, the amount of heat they generate also varies. Generally, the green LED module has the highest energy consumption rate (around 70 W) and the highest operating temperature (around 130° C.), and consequently generates more heat; the red LED module requires the lowest operating temperature (around 80° C.); and the blue LED module has an operating temperature (around 120° C.) between that of the green LED module and that of the red LED module. Therefore, in this embodiment, to dissipate the massive heat generated by the green LED module and to maintain the lower operating temperature of the red LED module, the red LED module and the green LED module are preferably disposed at positions nearer to the fan 22. Accordingly, in this example, the first light source 11 is a red LED module, the second light source 12 is a green LED module, and the third light source 13 is a blue LED module.

To appropriately allocate the dividing proportion of the first airflow 220a entering the first flow path 211 to the second airflow 220b entering the second flow path 212, the airflow 220 generated by the fan 22 has a blowing direction, which includes an included angle θ of substantially between 30° and 60° with respect to the central connecting tube 210b. By adjusting the included angle θ, the dividing proportion of the first airflow 220a to the second airflow 220b can be adjusted, and heat generated by the second light source 12 and the third light source 13 can be successfully dissipated outwards by a larger second airflow 220b via the air vents 214.

It shall be appreciated that when the second airflow 220b flows towards the second curved portion 210f, there is a curved angle, therefore the second airflow 220b tends to be obstructed due to collision against sidewalls of the second curved portion 210f. This would cause the airflow 220 to be divided to the first airflow 220a, making it difficult to divide the airflow 220. To prevent such a case, at least one air vent 215 is disposed between the second position 21b and the third position 21c in this embodiment. The air vent 215 should be disposed at the second curved portion 210f so that a portion of the second airflow 220b can dissipate a portion of the heat generated by the second light source 12 outwards via the air vent 215 disposed on the second curved portion 210f. The remaining portion of the second airflow 220b flows to the second lateral tube 210c along the second curved portion 210f, then flows through the third light source 13, which has the minimum heat dissipation requirement, and finally effuses out of the air vent 214 disposed at the end of the second flow path 212. In more detail, by adjusting the number and size of the air vents 215 of the second curved portion 210f, the dividing proportion of the first airflow 220a to the second airflow 220b may be further controlled. The higher the number of the air vents 215 in the second curved portion 210f, the greater the air mobility rate and, consequently, the greater the flow rate of the second airflow 220b flowing through the second position 21b. Thereby, the flow rate of the second airflow 220b flowing through the second light source 12 disposed at the second position 21b and that flowing through the third light source 13 disposed at the third position 21c may be controlled depending on the heat dissipation requirements of the second light source 12 and the third light source 13 respectively.

In reference to FIG. 1, the airflow guiding device 21 also has a dividing structure that is disposed in the first curved portion 210e and faces the air inlet 210d. The dividing structure has a partition 216, which may also assist in adjusting the dividing proportion of the first airflow 220a to the second airflow 220b. With this arrangement, the dividing proportion of the airflow 220 of the cooling device 2 may be adjusted depending on the amount of heat energy that is dissipated from the individual light sources, thereby obtaining a better cooling effect.

To dissipate the heat generated by the first light source 11, the second light source 12 and the third light source 13 outwards more effectively, the cooling device 2 further comprises a first heat sink 23, a second heat sink 24 and a third heat sink 25. The first heat sink 23 is disposed at the first position 21a in the first flow path 21 and attached to the first light source 11, while the second heat sink 24 and the third heat sink 25 are disposed at the second position 21b and the third position 21c in the second flow path 212 respectively and attached to the second light source 12 and the third light source 13 respectively. The first airflow 220a flows through the first heat sink 23, while the second airflow 220b flows through the second heat sink 24 and the third heat sink 25 in sequence. Thereby, the heat sinks are adapted to assist in outwardly dissipating the heat generated by the light sources through the airflow 220.

According to the present invention, by adjusting the included angle θ according to the heat dissipation requirements of the individual light sources 11, 12, 13 and adjusting the number and size of the air vents 213, 214, 215, the dividing proportion of the first airflow 220a to the second airflow 220b as well as the flow rates through the second light source 12 disposed at the second position 21b and the third light source 13 disposed at the third position 21c respectively can be adjusted. It shall be appreciated that the aforesaid examples of the LED modules are only provided for purposes of illustration but not limitation. For example, the first light source 11 may be a green LED module, the second light source 12 may be a red LED module, and the third light source 13 may still be a blue LED module. Alternatively, the first light source 11 may be a red LED module, the second light source 12 may be a blue LED module, and the third light source 13 may be a green LED module. Depending on the amount of heat generated by the different light source modules, the arrangement of LED modules, the number of air vents 213 and the value of the included angle θ may be readily modified by those of ordinary skill in the art upon reviewing the disclosures of the present invention, thereby, controlling the dividing proportion of the airflow 220.

According to the above description, as compared to the cooling device of the conventional projection apparatus, the present invention can control the dividing proportion of the airflow by adjusting the angle at which the fan is disposed and the number of air vents depending on the amount of heat generated by the different light sources. As a result, by using the least number of fans, the present invention can satisfy the heat dissipation requirements of the different light source modules, dissipate the heat effectively and reduce the noise of the cooling device, thereby improving the quality of the projection apparatus.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A cooling device applied in a projection apparatus, wherein the projection apparatus comprises a first light source, a second light source and a third light source, and the cooling device comprises:
    an airflow guiding device defining a first flow path and a second flow path; and
    a fan generating an airflow, in which the airflow is divided into a first airflow and a second airflow travelling along the first flow path and the second flow path, respectively;
    wherein the first flow path has a first position, the second flow path has a second position and a third position, the first light source, the second light source and the third light source are disposed at the first position, the second position and the third position respectively, the first airflow flows through the first position of the first flow path and effuses outward via a plurality of first air vents that are formed at an end of the first flow path, and the second airflow flows through the second position and the third position of the second flow path in sequence and effuses outward via a plurality of second air vents and a plurality of third air vents that are formed at an end of the second flow path, in which the plurality of the second air vents is located between the second position and the third position.

2. The cooling device as claimed in claim 1, wherein the cooling device further comprises a first heat sink, a second heat sink and a third heat sink disposed at the first position of the first flow path, the second position and the third position of the second flow path respectively and connected to the first light source, the second light source and the third light source respectively, the first airflow flows through the first heat sink, and the second airflow flows through the second heat sink and the third heat sink in sequence.

3. The cooling device as claimed in claim 1, wherein the airflow guiding device comprises an airflow guiding tube.

4. The cooling device as claimed in claim 3, wherein the airflow guiding tube is a U-shaped airflow guiding tube having a first lateral tube, a central connecting tube and a second lateral tube, the central connecting tube connects the first lateral tube and the second lateral tube to form a U-shaped structure, the first lateral tube defines the first flow path, the central connecting tube and the second lateral tube define the second flow path together, and the first position, the second position and the third position are located at the first lateral tube, the central connecting tube and the second lateral tube respectively.

5. The cooling device as claimed in claim 4, wherein the U-shaped airflow guiding tube comprises an air inlet, a first curved portion and a second curved portion, the first curved portion connects the first lateral tube and the central connecting tube, the second curved portion connects the central connecting tube and the second lateral tube, the air inlet is disposed on the first curved portion, the airflow generated by the fan enters the U-shaped airflow guiding tube via the air inlet, and the plurality of the second air vents located between the second position and the third position is disposed on the second curved portion.

6. The cooling device as claimed in claim 5, wherein the fan has a blowing direction, an included angle is defined between the blowing direction and the central connecting tube of the U-shaped airflow guiding tube, and the included angle is between 30 degrees and 60 degrees substantially to adjust a dividing proportion of the first airflow to the second airflow.

7. The cooling device as claimed in claim 5, wherein the airflow guiding device has a dividing structure disposed in the first curved portion, and the dividing structure has a partition to assist in adjusting a dividing proportion of the first airflow to the second airflow.

8. A projection apparatus, comprising:
    a first light source;
    a second light source;
    a third light source, and
    a cooling device as claimed in claim 1;
    wherein the first light source, the second light source and the third light source are disposed at the first position, the second position and the third position respectively and correspondingly.

9. The projection apparatus as claimed in claim 8, wherein a cooling device further comprises a first heat sink, a second heat sink and a third heat sink disposed at the first position of the first flow path, the second position and the third position of the second flow path respectively and connected to the first light source, the second light source and the third light source respectively, the first airflow flows through the first heat sink, and the second airflow flows through the second heat sink and the third heat sink in sequence.

10. The projection apparatus as claimed in claim 8, wherein the airflow guiding device is a U-shaped airflow guiding tube having a first lateral tube, a central connecting tube and a second lateral tube, the central connecting tube connects the first lateral tube and the second lateral tube to form a U-shaped structure, the first lateral tube defines the first flow path, the central connecting tube and the second lateral tube define the second flow path together, and the first position, the second position, and the third position are located at the first lateral tube, the central connecting tube and the second lateral tube respectively.

11. The projection apparatus as claimed in claim 10, wherein the U-shaped airflow guiding tube comprises an air inlet, a first curved portion and a second curved portion, and the first curved portion connects the first lateral tube and the central connecting tube, the second curved portion connects the central connecting tube and the second lateral tube, the air inlet is disposed on the first curved portion, the airflow generated by the fan enters the U-shaped airflow guiding tube via the air inlet, and the plurality of the second air vents located between the second position and the third position is disposed on the second curved portion.

12. The projection apparatus as claimed in claim 11, wherein the fan has a blowing direction, an included angle is defined between the blowing direction and the central connecting tube of the U-shaped airflow guiding tube, and the included angle is between 30 degrees and 60 degrees substantially to adjust a dividing proportion of the first airflow to the second airflow.

13. The projection apparatus as claimed in claim 11, wherein the airflow guiding device has a dividing structure disposed in the first curved portion, and the dividing structure has a partition to assist in adjusting a dividing proportion of the first airflow to the second airflow.

14. The projection apparatus as claimed in claim 8, wherein the first light source, the second light source and third light source are light-emitting diode (LED) modules.

15. The projection apparatus as claimed in claim 14, wherein the first light source is a red LED module, the second light source is a green LED module and the third light source is a blue LED module.

16. The projection apparatus as claimed in claim 14, the first light source is a green LED module, the second light source is a red LED module and the third light source is a blue LED module.

17. The projection apparatus as claimed in claim 14, the first light source is a red LED module, the second light source is a blue LED module and the third light source is a green LED module.

* * * * *